United States Patent
Landefeld et al.

(10) Patent No.: US 10,725,642 B2
(45) Date of Patent: *Jul. 28, 2020

(54) SYSTEMS AND METHODS FOR CONFIGURING DATA ALERTS

(71) Applicant: DOMO, Inc., American Fork, UT (US)

(72) Inventors: Adam Landefeld, Lehi, UT (US); Chris Willis, Heber City, UT (US); Alan Adams Winters, Lindon, UT (US); Dana Stott, Pleasant Grove, UT (US)

(73) Assignee: DOMO, INC., American Fork, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,487

(22) Filed: Apr. 15, 2019

(65) Prior Publication Data

US 2019/0377483 A1 Dec. 12, 2019

Related U.S. Application Data

(63) Continuation of application No. 15/864,840, filed on Jan. 8, 2018, now Pat. No. 10,261,680, which is a (Continued)

(51) Int. Cl.
*G06F 3/0484* (2013.01)
*G06Q 10/10* (2012.01)
*G06T 11/20* (2006.01)

(52) U.S. Cl.
CPC ...... *G06F 3/04847* (2013.01); *G06F 3/04842* (2013.01); *G06Q 10/10* (2013.01); *G06T 11/206* (2013.01); *G06T 2200/24* (2013.01)

(58) Field of Classification Search
CPC . G06F 3/04847; G06F 3/04842; G06Q 10/10; G06T 11/206
(Continued)

(56) References Cited

U.S. PATENT DOCUMENTS 7,107,339 B1 * 9/2006 Wolters ................ H04L 41/142
709/224
7,836,175 B2 * 11/2010 Bronoel ................ G06Q 10/00
709/219

(Continued)

OTHER PUBLICATIONS

Landefeld, et al., Non-Final Office Action dated Mar. 1, 2017 for U.S. Appl. No. 14/735,999.
(Continued)

*Primary Examiner* — Kerri L McNally
(74) *Attorney, Agent, or Firm* — Colby Nipper PLLC

(57) ABSTRACT

An alert may provide a user with notification when a trigger condition regarding the operation of an enterprise is satisfied. Prior to setting the alert, a proposed alert with the trigger condition may be received. The trigger condition may be compared with a database of operational data related to operation of the enterprise over a period of time to obtain historical trigger data. The historical trigger data may indicate how the proposed alert would have functioned if applied to the operational data for the period of time, for example, by indicating how many times the alert would have been triggered during the period of time. The historical trigger data may be provided to a user, and may facilitate user determination of whether the proposed alert will perform as desired. Once the desired proposed alert has been entered, the user may set the proposed alert as an actual alert.

20 Claims, 12 Drawing Sheets

Related U.S. Application Data continuation of application No. 14/735,999, filed on Jun. 10, 2015, now Pat. No. 9,891,807, which is a continuation of application No. 14/607,427, filed on Jan. 28, 2015, now Pat. No. 9,082,282.

(60) Provisional application No. 61/932,622, filed on Jan. 28, 2014.

(58) Field of Classification Search
USPC .......................................................... 340/506
See application file for complete search history.

(56) References Cited

U.S. PATENT DOCUMENTS

| | | |
|---|---|---|
| 9,082,282 B1 | 7/2015 | Landefeld et al. |
| 9,891,807 B1 | 2/2018 | Landefeld et al. |
| 2010/0318487 A1* | 12/2010 | Marvasti ................ G06N 20/00 706/47 |
| 2018/0129406 A1 | 5/2018 | Landefeld et al. |

OTHER PUBLICATIONS

Landefeld, et al., Notice of Allowance dated Apr. 6, 2015 for U.S. Appl. No. 14/607,427.
Landefeld, et al., Notice of Allowance dated Dec. 12, 2018 for U.S. Appl. No. 15/864,840.
Landefeld, et al., Notice of Allowance dated Sep. 25, 2017 for U.S. Appl. No. 14/735,999.
Landefeld, et al., Office Action dated Jun. 18, 2018 for U.S. Appl. No. 15/864,840.

* cited by examiner

FIG. 5

Set New Alerts

| Overview | My Alerts | Explore Alerts | Set New Alerts | Mobile Viewer |

QUICK-PICKS
- ⊙ Recently Viewed
- #domosocial Experiment Usage
  - Cash Balance
  - EMP Performance
  - Total Headcount
  - Pipeline Plus Closed
- ★ Favorites
- ▸ ⊞ Marketing
  - ▸ ⊞ Branding/Awareness
  - ▸ ⊞ Demand Generation
  - ▸ ⊞ Pipeline
  - ▸ ⊞ Calendar
  - ▸ ⊞ Social Experiment
- ▸ ⊞ Product
- ▸ ⊞ Finance
- ▸ ⊞ Customer
- ▸ ⊞ Operations
- ▸ ⊞ Community Platform Alert Me: Cash Balance — 510

Alert Me [if] [⊙] 30-Day Average [⊙] [falls below] [⊙] $4,800,000 — 564 — [Follow Alert] — 570
  568    560  566          562

580 — This alert would have been triggered - 7 - times in the past 90 days

HISTORICAL VALUES FOR
CASH BALANCE — 520
584 — 365-day Minimum - $4,223,865
90-day Average - $4,910,335
365-day Maximum - $9,743,289

Alert me on Change in total value of Cash Balance. — Created by You [Following] [Share]
                                    530

Alert me if Total value of Cash Balance falls below $4,700,000. — Created by You [+9] [Following] [Share]

Alert me on the % Change in Total value of Cash Balance. — Created by Ben DeSantos [+12] [Follow] [Share]

Alert me on Total value of Cash Balance. Domo Suggests [≈≈≈] [+3] [Follow] [Share] — 582

My Alerts
Monitor and manage the alerts you create and follow.
△ Triggered          7
△ Close to Triggering  11
       550

[Following | Trending | All Activity]

⊚ All SQLs
Comment  Share  Like

[👤][▸] Javier Costas  6 days ago
assigned a task to Sarah Monroe
☐ Please compile a list on top 10 deals in pipeline and features requested for deals to close.
Due Tomorrow
Comment  Share  Like

[👤] Chris Norris  6 days ago
on Unique Visitors
@Paulo Villa Mayor why does this say it was updated 6 days ago?
domosocial Usage  ♡1
3.75k            👥9
Average
Comment  Share  Unlike
⊙ View all 5 comments

[👤] Paulo Villa Mayor  ♡13 Likes
Update: Adobe committed to  4 days ago
delivering us a signable contract by tomorrow.   Like
Comment  Share  Like

[👤] Nathan Richards  5 minutes ago
created an alert on Cash Balance
Cash Balance   △2
$4,922,447     ♡17
Current        👥88
Comment  Share  Like

[👤] Marla Hale  5 minutes ago
on Date Performance

Currently Online              View All
[icons]
⊙Help  Feedback      Powered by

SYSTEMS AND METHODS FOR CONFIGURING DATA ALERTS

CROSS-REFERENCE TO RELATED APPLICATIONS

The Application Data Sheet ("ADS") filed in the present application is incorporated by reference. Any applications claimed on the ADS for priority under 35 U.S.C. §§ 119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith. The present application claims priority to: U.S. patent application Ser. No. 15/864,840, filed Jan. 8, 2018 and issued as U.S. Pat. No. 10,261,680 on Apr. 16, 2019, U.S. patent application Ser. No. 14/735,999, filed Jun. 10, 2015 and issued as U.S. Pat. No. 9,891,807 on Feb. 13, 2018, U.S. patent application Ser. No. 14/607,427, filed Jan. 28, 2015 and issued as U.S. Pat. No. 9,082,282 on Jul. 14, 2015, and U.S. Provisional Application Ser. No. 61/932,622, filed Jan. 28, 2014, each of which is hereby incorporated by reference.

TECHNICAL FIELD

The present application relates to mechanisms for setting alerts to notify users of the satisfaction of certain trigger conditions in the operational data of an enterprise.

DESCRIPTION OF THE RELATED ART

In the context of a software system, an alert is a trigger condition that can be automatically monitored so that notification can be provided to the user when the trigger condition is satisfied. The notification may be any form of output that presents information to a user at a given time or in response to satisfaction of a given trigger event, rather than output that is presented immediately in response to a user request. Possible forms of output may include emails, SMS messages, visual cues, audible tones, combinations thereof, and the like.

Many existing systems allow users to configure alerts that will notify them when some change takes place with regard to stored data. Conventionally, when a user sets a data-driven threshold or change-based alert, it may be challenging to determine an appropriate threshold or change value for the alert. Too low a threshold can result in information fatigue; too high a threshold can result in important information and events being missed. Often a user must be subscribed to an alert for several iterations before he or she can understand what causes the alert to trigger and how frequently it triggers. This makes the process of setting a useful alert relatively time consuming.

SUMMARY

Various embodiments of the present disclosure provide the user with an indication of how a proposed alert is likely to function on the basis of prior operational data related to an enterprise. The present disclosure may facilitate a determination of the usefulness of a data alert by examining the settings and thresholds a user may set to trigger the proposed alert, and then examining historical patterns of the data being alerted on and historical events related to the data.

More specifically, prior to setting an alert, the user may provide the proposed alert with a trigger that defines how the proposed alert is triggered. The trigger condition may include a metric, which may be a piece of data stored on a periodic basis in the operational data. Further, the trigger condition may include a threshold value and an operator such as greater than the threshold, less than the threshold, equal to the threshold, or other comparative value, such as standard deviations from the norm. The threshold may be provided as text by the user, selected on a data visualization such as a chart or graph, or by other means.

The trigger condition may be compared with a database of the operational data, relative to a period of time, to obtain historical trigger data. The historical trigger data may indicate how the proposed alert would have functioned if applied to the operational data for the period of time, for example, by indicating how many times the alert would have been triggered during the period of time.

The historical trigger data may be provided to a user. The historical trigger data may be provided, for example, as text and/or a data visualization displayed on a display screen. The historical trigger data may be displayed as an activity indicator proximate an alert entry module. The historical trigger data may optionally include historical values for the metric. Examples of historical trigger data may include, but are not limited to:

How many times the alert would trigger.
How frequently it would trigger.
Whether it would trigger at all.
Whether the change shown would be meaningful.
Historical values such as high, low, and mean.

The system may be able to simulate the value of any given alert for the user. In at least one embodiment, the system may present a reasonable default recent period of time for an alert, but may also provide the ability for users to set this time period themselves or to override the default suggestion.

The user may determine whether the historical trigger data indicates that the proposed alert will perform as desired. Once the desired proposed alert has been entered, the user may provide input to set the proposed alert as an actual alert.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

FIG. 5 is a screenshot depicting entry of a proposed alert via text entry, and provision of historical trigger data, according to one embodiment.

FIG. 6 is a screenshot depicting entry of a different proposed alert, and provision of historical trigger data, according to the embodiment of FIG. 5.

FIG. 7 is a screenshot depicting entry of a proposed alert via text entry, and provision of historical trigger data, according to another embodiment.

DETAILED DESCRIPTION OF THE EMBODIMENTS

In at least one embodiment, the system and method described herein facilitate the configuration of alerts regarding the operation of an enterprise by providing the user with historical trigger data that indicate how a proposed alert would have functioned historically. Based on the historical trigger data, the user may decide to set the proposed alert as an alert, or modify it before setting it. Thus, the alert may have a stronger likelihood of triggering at the appropriate frequency.

In this application, an "alert" is a trigger condition that, if satisfied, will trigger transmission of notification to a user. A "proposed alert" is a set of trigger conditions that have been entered but have not yet been set as an actual alert. An "enterprise" is any entity that exists for the purpose accomplishing a one or more tasks or objectives, including but not limited to for-profit entities, governmental bodies, and non-profit organizations. "Operational data" is any data indicative of the operation of an enterprise. "Historical trigger data" is data that indicate how an alert or proposed alert would have functioned if applied to the prior operation of an enterprise. A "data visualization" is a graphical representation of data, such as a chart, graph, table of summarized data, or the like.

System Architecture

According to various embodiments, the system can be implemented on any electronic device equipped to receive, store, and present information. Such an electronic device may be, for example, a desktop computer, laptop computer, smartphone, tablet computer, or the like.

Although the system is described herein in connection with an implementation in a computer, one skilled in the art will recognize that the techniques described herein can be implemented in other contexts, and indeed in any suitable device capable of receiving and/or processing user input. Accordingly, the following description is intended to illustrate various embodiments by way of example, rather than to limit scope.

Figure 1A:
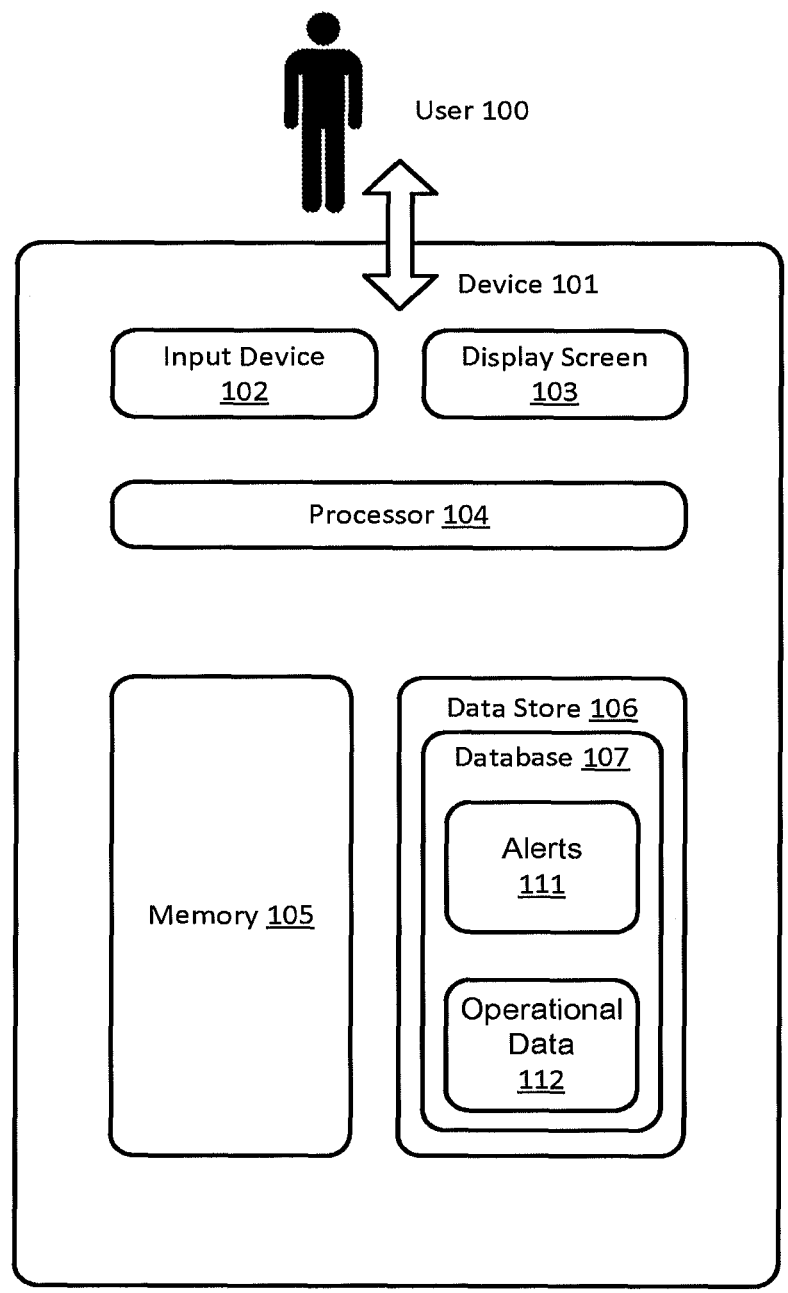
FIG. 1A is a block diagram depicting a hardware architecture according to one embodiment.

Referring now to FIG. 1A, there is shown a block diagram depicting a hardware architecture for practicing the described system, according to one embodiment. Such an architecture can be used, for example, for implementing the techniques of the system in a computer or other device 101. Device 101 may be any electronic device equipped to receive, store, and/or present information, and to receive user input in connect with such information.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Data store 106 can be any magnetic, optical, or electronic storage device for data in digital form; examples include flash memory, magnetic hard drive, CD-ROM, DVD-ROM, or the like. In at least one embodiment, data store 106 stores information which may include one or more databases, referred to collectively as a database 107, that can be utilized and/or displayed according to the techniques described below. In another embodiment, database 107 can be stored elsewhere, and retrieved by device 101 when needed for presentation to user 100. Database 107 may include one or more data sets, which may be used for a variety of purposes and may include a wide variety of files, metadata, and/or other data. In at least one embodiment, database 107 may include alerts 111 and operational data 112.

Display screen 103 can be any element that graphically displays information such as items from database 107 and/or the results of steps performed on such items to provide information useful to a user. Such output may include, for example, raw data, data visualizations, navigational elements, queries requesting confirmation and/or parameters for information identification, display, or presentation, or the like. In at least one embodiment where only some of the desired output is presented at a time, a dynamic control, such as a scrolling mechanism, may be available via input device 102 to change which information is currently displayed, and/or to alter the manner in which the information is displayed.

In at least one embodiment, the information displayed on display screen 103 may include data in text and/or graphical form. Such data may comprise visual cues, such as height, distance, and/or area, to convey the value of each data entry. In at least one embodiment, labels accompany data entries on display screen 103, or can be displayed when user 100 taps on or clicks on a data entry, or causes an onscreen cursor to hover over a data entry.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate means. This communication with other electronic devices is provided as an example and is not necessary.

In at least one embodiment, data store 106 is detachable in the form of a CD-ROM, DVD, flash drive, USB hard drive, or the like. Database 107 can be entered from a source outside of device 101 into a data store 106 that is detachable, and later displayed after the data store 106 is connected to device 101. In another embodiment, data store 106 is fixed within device 101.

Figure 1B:
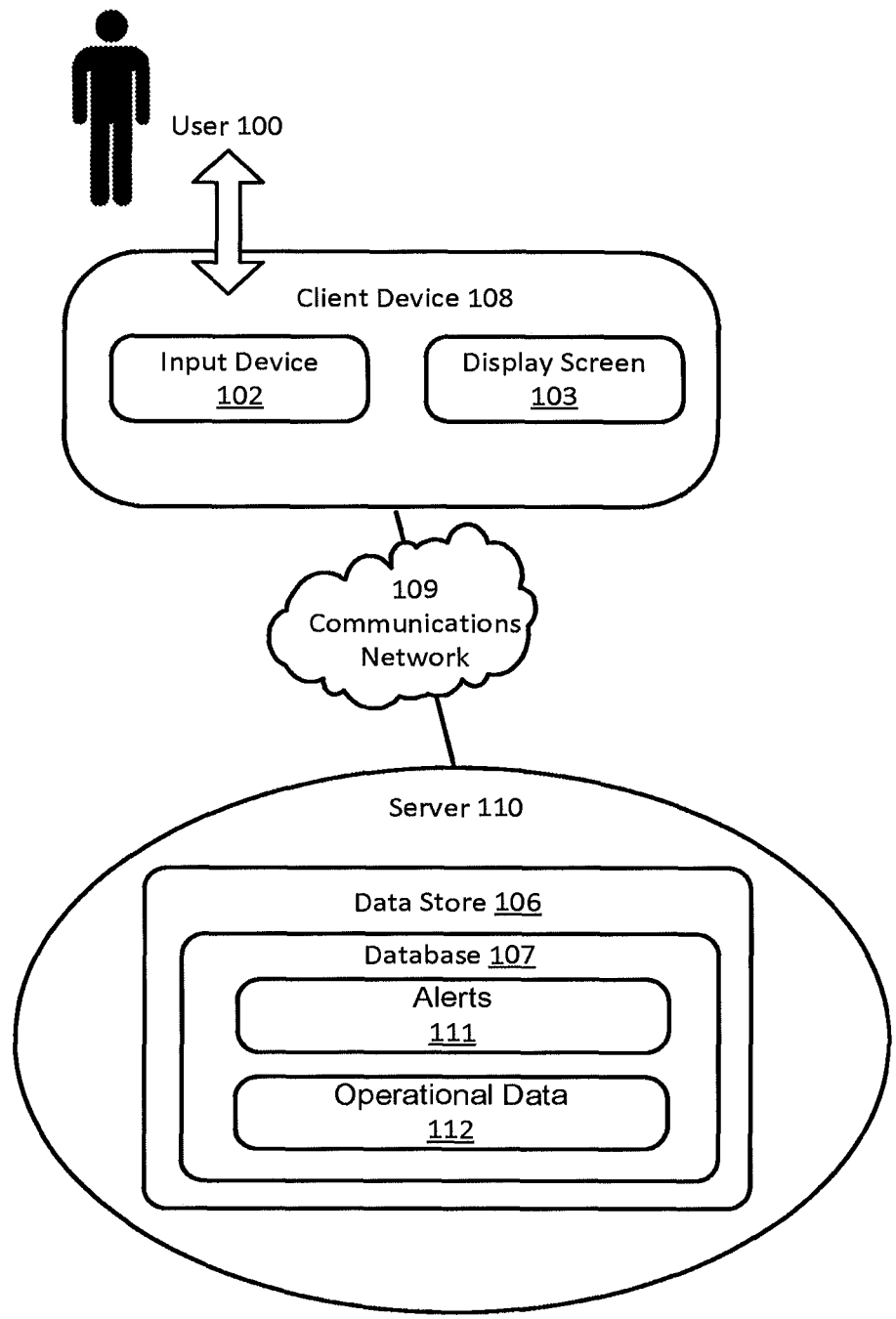
FIG. 1B is a block diagram depicting a hardware architecture in a client/server environment, according to one embodiment.

Referring now to FIG. 1B, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from the database 107, reports, and/or other data derived from the database 107 can be presented as part of such web pages and/or other web-based resources, using known protocols and languages such as Hypertext Markup Language (HTML), Java, JavaScript, and the like.

Client device 108 can be any electronic device incorporating the input device 102 and/or display screen 103, such as a desktop computer, laptop computer, personal digital assistant (PDA), cellular telephone, smartphone, music player, handheld computer, tablet computer, kiosk, game system, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data.

In this implementation, server 110 is responsible for data storage and processing, and incorporates data store 106 for storing database 107. Server 110 may include additional components as needed for retrieving data and/or database 107 from data store 106 in response to requests from client device 108.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

In at least one embodiment, database 107 is organized in a file system within data store 106. Appropriate indexing can be provided to associate particular documents with particular quantitative data elements, reports, other documents, and/or the like. Database 107 may include any of a wide variety of data structures known in the database arts. As in FIG. 1A, database 107 may include one or more data sets, which may include alerts 111, operational data 112, and/or other data (not shown).

Alerts 111 and/or operational data 112 can be retrieved from the data store 106, or from any other source. Data store 106 may be client-based and/or server-based. In at least one embodiment, input device 102 is configured to receive data entries from user 100, to be added to data store 106. User 100 may provide such data entries via the hardware and software components described above according to means that are well known to those skilled in the art. Server 110 may be connected to several client devices 108 that are used by various individuals of the enterprise, and may thus store alerts 111 and/or operational data 112 from multiple users and/or multiple client devices 108. Alerts 111 and/or operational data 112 may be used to generate notifications to the user 100, which may be transmitted via the display screen 103 and/or one or more other output devices.

Display screen 103 can be any element that graphically displays information such as items from database 107 and/or the results of steps performed on such items to provide information useful to a user. Such output may include, for example, raw data, data visualizations, navigational elements, queries requesting confirmation and/or parameters for information identification, display, or presentation, or the like. In at least one embodiment where only some of the desired output is presented at a time, a dynamic control, such as a scrolling mechanism, may be available via input device 102 to change which information is currently displayed, and/or to alter the manner in which the information is displayed.

In at least one embodiment, the information displayed on display screen 103 may include data in text and/or graphical form. Such data may comprise visual cues, such as height, distance, and/or area, to convey the value of each data entry. In at least one embodiment, labels accompany data entries on display screen 103, or can be displayed when user 100 taps on or clicks on a data entry, or causes an onscreen cursor to hover over a data entry.

Processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software.

In one embodiment, the system can be implemented as software written in any suitable computer programming language, whether in a standalone or client/server architecture. Alternatively, it may be implemented and/or embedded in hardware.

Alert Structure

In general, the data stored within data store 106 of FIG. 1A or FIG. 1B may include one or more pieces of data, each of which may be of any desired length and format. Thus, each piece of data may be a character string, integer, floating point number, or any other type of data, and may thus represent any information such as names, times, dates, currency amounts, percentages, fractions, physical dimensions, or any other data that may desirably be stored in a computer. As mentioned previously, data store 106 may include alerts 111, operational data 112, and/or other data (not shown).

Figure 2A:
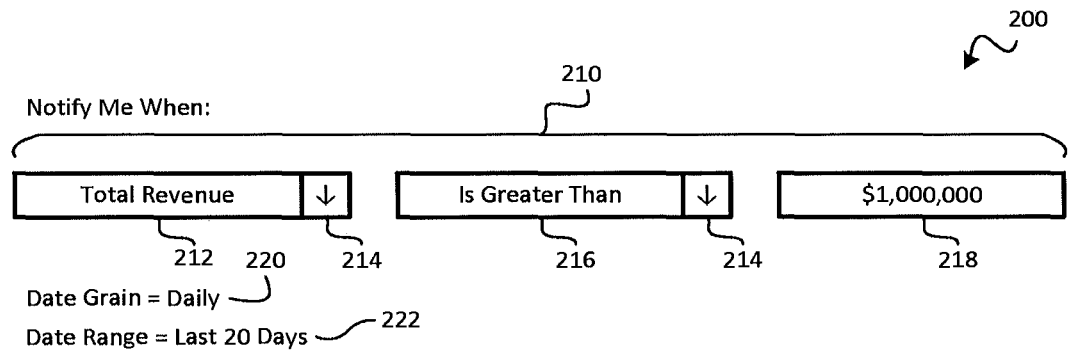
FIGS. 2A to 2C are block diagrams depicting trigger conditions of various alerts, according to selected embodiments.

Referring to FIG. 2A, a block diagram depicts the structure of an alert 200, which is shown by way of example according to one embodiment. The alert 200 may have a set of trigger conditions 210 which, when satisfied, will trigger transmission of a notification to the user 100. The trigger condition 210 of FIG. 2A is shown as menu selections and/or text entry boxes as may be present in a user interface; however, in alternative embodiments, they may be entered via manipulation of data visualizations, widgets, or via other user input methods.

In the exemplary embodiment of FIG. 2A, the trigger condition 210 may include a metric 212, which is the item to be measured as a basis of the alert 200. The metric 212 may be selected, for example, through the use of a dropdown menu accessible via an arrow 214. The dropdown menu may show a list of the metrics 212 stored in the operational data 112. Thus, the user 100 may click or tap the arrow 214 to reveal the dropdown menu and select the desired metric on which the alert 200 is to be based.

The trigger condition 210 may also include an operator 216 and a threshold 218. The operator 216 may be the type of comparison to be performed between the threshold 218 and the metric 212. Thus, the trigger condition 210 may be satisfied when the metric 212 meets the condition specified by the operator 216, relative to the threshold 218.

Like the metric 212, the operator 216 may be displayed alongside an arrow 214 that can be clicked or tapped by a user to display a dropdown menu listing the various operators that are available for use in alerts. For a threshold 218 in the form of a number, such operators may include, but are not limited to, greater than, less than, and equal to. Other operators may be used with different threshold types, as will be shown and described in connection with other embodiments.

The alert 200 may further include a date grain 220 and a date range 222. The date grain 220 may indicate the period of time over which the metric 212 is to be measured to determine whether the trigger condition 210 is satisfied. The date range 222 may be the dates over which the trigger condition 210 is to be applied. Thus, in the example of FIG. 2A, the trigger condition 210 may be satisfied if the total revenue in a day is greater than $1,000,000, any time within the last thirty days. The date grain 220 and the date range may be user-adjustable, or may not be adjustable.

When the trigger condition 210 is satisfied, notification may be transmitted to the user 100 in a variety of ways. Such ways may include, but are not limited to, e-mails, instant messages, text messages, auditory signals, speech, graphical displays, and/or messages from within various computer programs. According to one embodiment, the alert 200 may specify the manner(s) in which the notification is to be transmitted to the user 100. This notification method may be user-selectable via various menus (not shown), radio buttons (not shown), and/or other user interface elements (not shown).

Figure 2B:
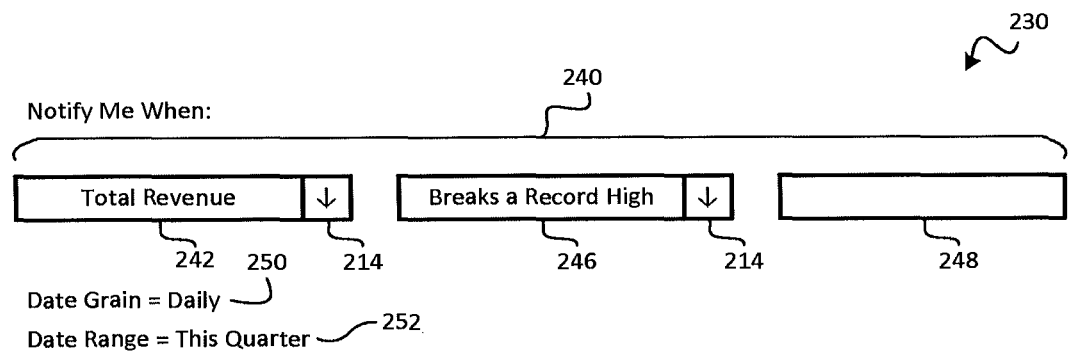

Referring to FIG. 2B, a block diagram depicts the structure of an alert 230, which is shown by way of example according to another embodiment. The alert 230 may have a set of trigger conditions 240 which, when satisfied, will trigger transmission of a notification to the user 100. The trigger condition 240 of FIG. 2B is shown as menu selections and/or text entry boxes as may be present in a user interface; however, in alternative embodiments, they may be entered via manipulation of data visualizations, widgets, or via other user input methods.

As in the alert 200 of FIG. 2A, the trigger condition 240 of the alert 230 of FIG. 2B may have a metric 242, an operator 246, a date grain 250, and a date range 252. The operator 246 may be "breaks a record high." This requires comparison to, not a single numerical threshold, but rather, to a threshold in the form of the highest previous total revenue. Thus, a blank field 248 may be used for the threshold of the trigger condition 240, because no user input is required for the threshold. The threshold already exists in the data to be compared.

Per the date grain 250, the revenue to be assessed is, again, daily revenue. In alternative embodiments, any date grain may be used, including but not limited to seconds, minutes, hours, work days, weeks, months, and years.

However, per the date range 252, rather than reviewing a period of thirty days as in the trigger condition 210 of FIG. 2A, total daily revenue for each day of the current quarter is reviewed. Notably, while the date range 222 of FIG. 2A is a rolling time period that remains the same size (thirty days) regardless of the date, the date range 252 is a definite beginning date (the first date of the current quarter), and will grow longer as the current quarter progresses, until the end of the quarter is reached.

Figure 2C:
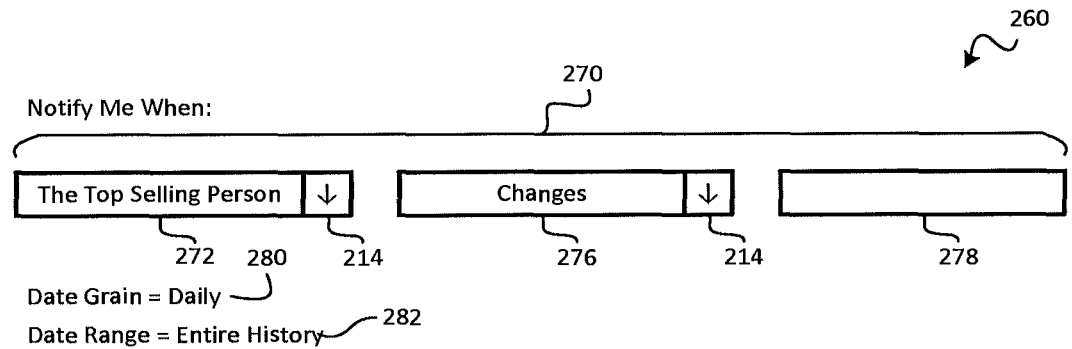

Referring to FIG. 2C, a block diagram depicts the structure of an alert 260, which is shown by way of example according to another embodiment. The alert 260 may have a set of trigger conditions 270 which, when satisfied, will trigger transmission of a notification to the user 100. The trigger condition 270 of FIG. 2C is shown as menu selections and/or text entry boxes as may be present in a user interface; however, in alternative embodiments, they may be entered via manipulation of data visualizations, widgets, or via other user input methods.

As in the alert 200 of FIG. 2A and the alert 230 of FIG. 2B, the trigger condition 270 of the alert 260 of FIG. 2C may have a metric 272, an operator 276, a date grain 250, and a date range 252. The metric 272 may be the "top selling person," and the operator 246 may be "changes." As in the alert 230 of FIG. 2B, this requires comparison to, not a single numerical threshold, but rather, to values that are tracked and stored by the system. For example, the top selling person may be recorded each day as a character string. When a new top selling person is entered, the trigger condition 270 may be satisfied, and the alert 260 may be triggered. In other embodiments, sales revenue, sales units, or other metrics may be tracked for various individuals, and the system may automatically determine which individual has the highest sales in any given day. Again, when the identity of this individual changes, the alert 260 may be triggered. As in the trigger condition 240 of FIG. 2B, a blank field 278 may be used for the threshold of the trigger condition 270, because no user input is required for the threshold. The threshold already exists in the data to be compared.

As in FIG. 2A and FIG. 2B, the alert 260 may have a date grain 280, which may be daily. The alert 260 may also have a date range 282, which may be the entire history, i.e., all dates for which the operational data 112 needed to determine the top selling person exists.

FIGS. 2A, 2B, and 2C are merely exemplary. Those of skill in the art will recognize that alerts may be generated using a wide variety of metrics, operators, and thresholds (whether user-defined or found in recorded date), aside from those shown and described in these exemplary embodiments.

Automatic Provision of Historical Trigger Data

Alerts may be implemented in a variety of ways. According to some embodiments, alerts may be implemented on enterprise management software that performs multiple functions. For example, such software may facilitate communications among employees of an enterprise, performance tracking through the use of key performance indicators or other tools, and/or the like. Thus, the setting alerts and/or receiving notification may be carried out in conjunction with other activities that can be performed on the software platform. Alternatively, alerts may be carried out through the use of more specialized software that only provides the alert and/or notification functionality. In either case, the methods set forth herein may be performed with the aid of a computing system, such as the device 101 of FIG. 1A and/or the client device 108 and/or server 110 of FIG. 1B.

Figure 3:
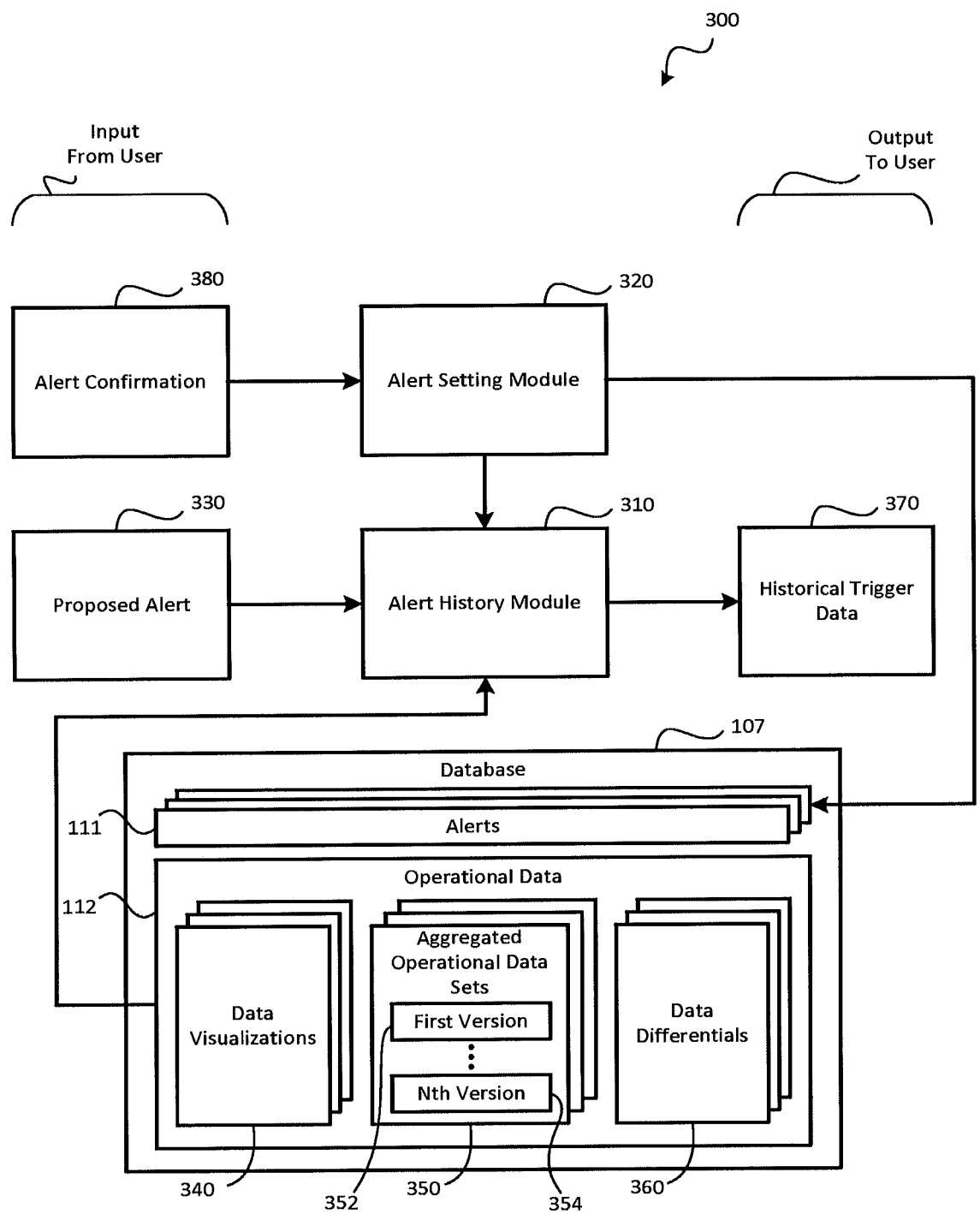
FIG. 3 is a block diagram depicting a system for setting alerts, according to one embodiment.

Referring to FIG. 3, a block diagram illustrates a system 300 according to one embodiment. The system 300 may be designed to facilitate alert setting by automatically providing historical trigger data that indicates how a proposed alert would have functioned if applied to the operational data 112 previously generated for the enterprise. As indicated previously, alert functionality may be carried out in a system that performs other functions pertinent to the management of an enterprise. However, only the architecture pertinent to alerts is shown in FIG. 3.

As shown, the system 300 may have an alert history module 310 and an alert setting module 320. In general, the alert history module 310 may provide the historical trigger data referenced above, and the alert setting module 320 may be used to set the alert when it has been properly formulated.

More specifically, the user may provide a proposed alert 330, for example via the input device 102. The proposed alert 330 may be structured, for example, in a manner similar to that of the alert 200 of FIG. 2A, the alert 230 of FIG. 2, and/or the alert 260 of FIG. 2C. The proposed alert 330 may be received via text entry, manipulation of a data visualization, or through other methods, as will be set forth in greater detail subsequently.

The alert history module 310 may receive the proposed alert 330, and may query the database 107 to determine how the proposed alert 330 would have functioned if applied to the operational data 112. This information may be presented to the user 100 as historical trigger data 370. The operational data 112 may include various data structures that may facilitate and/or expedite this comparison. For example, the operational data 112 may include one or more data visualizations 340, one or more aggregated operational data sets 350, and/or one or more data differentials 360. These will be described in greater detail below.

The data visualizations 340 may include any graphical representations of the data of the operational data 112, such as charts, graphs, and the like. The data visualizations 340 may be viewed by the user 100 in order to facilitate entry of the proposed alert 330. Additionally or alternatively, the data visualizations 340 may be used as part of the historical trigger data 370.

Each of the aggregated operational data sets 350 may include the operational data 112, or a subset of the operational data 112, organized according to various schemas. In some examples, each of the aggregated operational data sets 350 may be organized according to the date grain that will be used for the proposed alert 330 (or if the date grain is adjustable in the proposed alert 330, the most likely date grain to be used). Thus, for example, the operational data sets 350 may each have data broken down by date, with individual days listed separately to facilitate calculations based on a "daily" date grain.

The aggregated operational data sets 350 may each include a subset of the operational data 112, if desired. Thus, the alert 200 of FIG. 2A, for which the metric 212 is "total revenue," may only require that the alert history module 310 reference the one or more aggregated operational data sets 350 that include "total revenue," broken down by date. This may expedite the data transfer processes and/or calculations required to obtain the historical trigger data 370 because only a subset of the operational data 112 may need to be retrieved and/or compared.

Each of the aggregated operational data sets 350 may optionally be stored in multiple versions in the operational data 112. Thus, for example, one aggregated operational data set 350 may store only current data, such as the "top selling person," as referenced in the metric 272 of FIG. 2C. Since this data may change from one time period to the next, multiple versions of such an aggregated operational data set 350 may be stored in the operational data 112. A new version of such an aggregated operational data set 350 may be stored periodically, without overwriting the previous version. Thus, any given aggregated operational data set 350 may include a first version 352 and, optionally, one or more additional versions up to an nth version 354. In the case of the aggregated operational data sets 350 for the "top selling per-son," any two adjacent versions of the aggregated operational data set may be compared with each other to determine how many times the trigger condition 270 of the alert 260 of FIG. 2C would have been satisfied over a specified period of time (such as the date range 282 of FIG. 2C).

The data differentials 360 may include comparisons of various data that can be referenced to facilitate the calculations needed to obtain the historical trigger data 370. For example, some alerts may be based on the change of a metric from one time period to another. More specifically, an alert may be triggered when the sales from one day to the next change by more than a predetermined amount. In order to expedite determination of how many times such an alert would have been triggered over a given time period, it may be advantageous to record data differentials 360 that include the change in daily sales between each day and the previous day. Then, in order to obtain the historical trigger data 370, subtractions need not be carried out. Rather, the change in daily sales, stored previously in the data differentials 360, may simply be compared with the threshold for each day.

In alternative embodiments, the data visualizations 340, aggregated operational data sets 350, and/or the data differentials 360 may be generated on-the-fly based on the operational data 112, as it exists in raw form. However, generation of these elements may be somewhat time-consuming, depending on the scope of the operational data 112. Accordingly, generating them prior to receipt of the proposed alert 330 from the user 100 may help to minimize the amount of time the user 100 has to wait between entry of the proposed alert 330 and provision, to the user 100, of the historical trigger data 370. The system 300 may be customizable to determine whether the data visualizations 340, the aggregated operational data sets 350, and/or the data differentials 360 are generated before they are needed by the user 100, and if so, which of each are generated and stored in the operational data 112.

After the alert history module 310 has compared the proposed alert 330 with the operational data 112, the historical trigger data 370 may be obtained and provided to the user 100. This may be done, for example, by displaying text and/or one or more data visualizations on the display screen 103. The historical trigger data 370 may provide various data, such as:

Whether the proposed alert 330 would have been triggered within the applicable date range;

How many times, within the applicable date range, the proposed alert 330 would have been triggered;

The frequency at which the proposed alert 330 would have been triggered within the applicable date range (for example, how many times per month);

The significance of triggering of the proposed alert 330 (for example, by assuming that an alert that would be triggered more frequently would be less significant than an alert that triggers more rarely); and Historical values and/or statistics of the metric of the proposed alert 330 (for example, high, low, mean, median, standard deviation, and the like).

After the user 100 has had the opportunity to review the historical trigger data 370, he or she may desire to set the proposed alert 330 as an alert in the system 300, or to make changes to the proposed alert 330 before the corresponding alert is set. Once the proposed alert 330 is ready to be set as an alert in the system 300, the user 100 may provide an alert confirmation 380.

The alert confirmation 380 may be received by the alert setting module 320. The alert setting module 320 may store a new alert in the alerts 111 of the database 107. The new alert may have the trigger condition and/or other parameters of the proposed alert 330. The system 300 may provide notifications to the user 100 on the basis of the alerts 111; accordingly, the new alert may also be used to transmit a notification to the user 100 when the trigger condition of the new alert has been satisfied.

Figure 4:
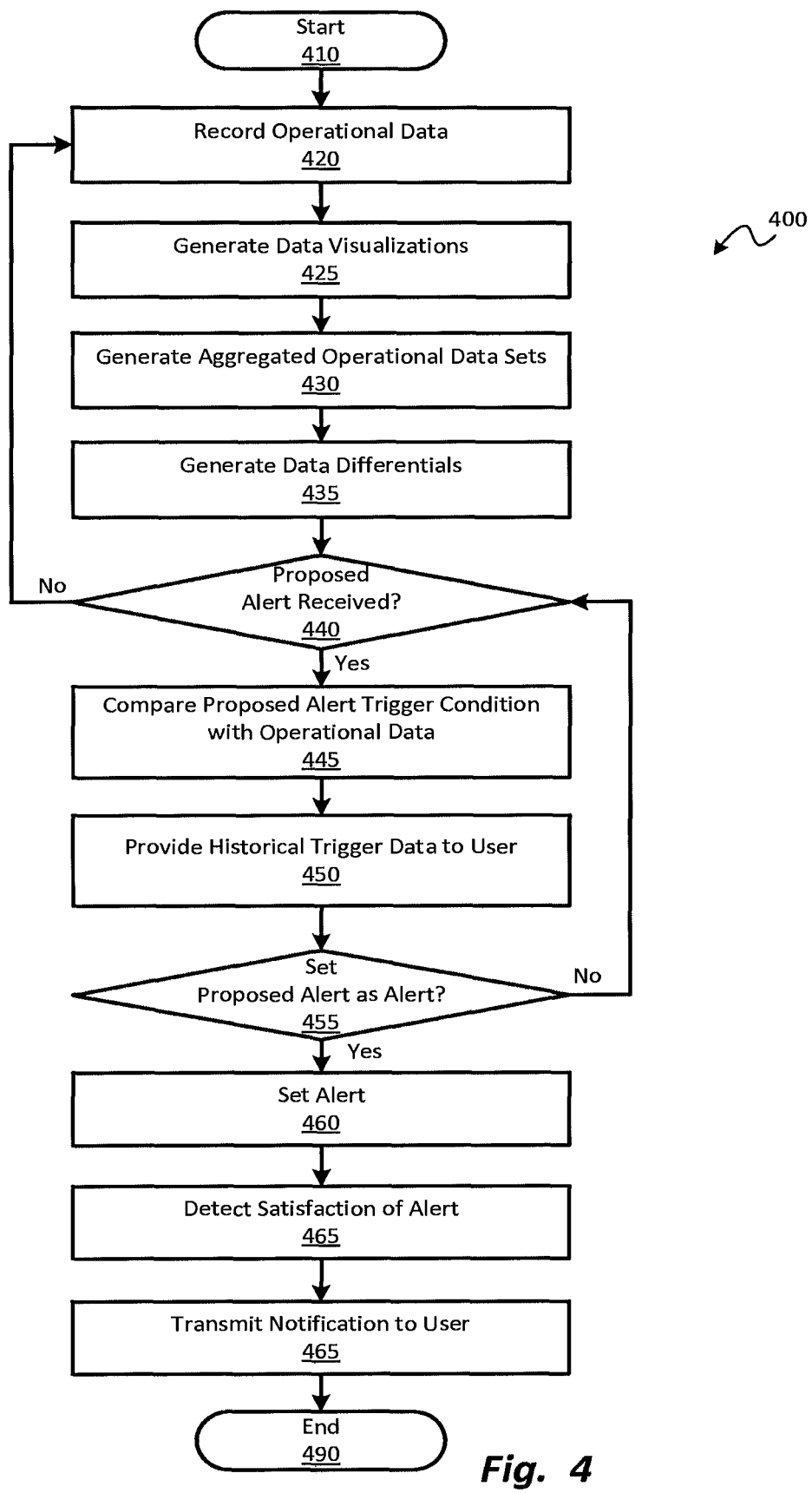
FIG. 4 is a flowchart depicting a method of setting alerts, according to one embodiment.

Referring to FIG. 4, a flowchart diagram illustrates a method 400 of setting an alert according to one embodiment. The method 400 may be carried out through the use of a system such as the system 300 of FIG. 3, as will be described by way of example below. Additionally or alternatively, other systems may be used to carry out the method 400. Further, a system such as the system 300 of FIG. 3 may be used to carry out other methods besides the method 400 of FIG. 4.

As shown, the method 400 may start 410 with a step 420 in which the operational data 112 is recorded. This may be done automatically or manually, by various individuals of the enterprise. The operational data 112 may be stored in the database 107 in the data store 106, as indicated previously.

The method 400 may proceed to a step 425 in which the one or more data visualizations 340 are generated, a step 430 in which the aggregated operational data set 350 are generated, and a step 435 in which the data differentials are generated. As mentioned previously, performance of the step 425, the step 430, and/or the step 435 may be optional; any of these steps, if desired, may be replaced with calculations and/or data manipulations performed on-the-fly after the proposed alert 330 is received.

The method 400 may proceed to a query 440 in which a determination is made as to whether a proposed alert 330 has been received. If the proposed alert 330 has not been received, the steps 420, 425, 430, and 435 may be repeated until a proposed alert 330 is received. Thus, the operational data 112 may be continuously updated until the proposed alert 330 is received. This updating process may optionally entail updating the one or more data visualizations 340, the one or more aggregated operational data set 350, and/or the one or more data differentials 360.

Pursuant to the query 440, if a determination is made that the proposed alert 330 has been received, the method 400 may proceed to a step 445 in which the proposed alert 330 is compared with the operational data 112. This may be done as set forth in the description of FIG. 3. Thus, the step 445 may entail comparison of the proposed alert 330 with the data visualization 340, the aggregated operational data set 350, and/or the data differential 360, as applicable. This comparison may yield the historical trigger data 370, as described previously.

The method 400 may proceed to a step 450 in which the historical trigger data 370 are provided to the user 100. As indicated previously, this may entail display of text and or data visualizations on the display screen 103 of the device 101 and/or the client device 108.

In a query 455, a determination may be made as to whether the proposed alert 330 is to be set as an alert in the system 300. For example, the user 100 may make a selection to confirm a proposed alert 330 to set the proposed alert 330 as an alert 111 to be stored in the database 107 and used to provide notification per the trigger condition of the alert 111.

If no such confirmation is received, the method 400 may return to the query 440, in which a determination is made as to whether a proposed alert 330 has been received. If no proposed alert 330 is received, the method 400 may return to the step 420, in which operational data 112 is recorded by updating the operational data 112 previously recorded.

Pursuant to the query 440, if the proposed alert 330 has been received, this proposed alert 330 may be a revised version of the one previously entered. The system 300 may again compare the proposed alert 330, in its revised form, with the operational data 112 to obtain the historical trigger data 370 for the proposed alert 330, and provide the resulting historical trigger data 370 to the user 100.

Once the user 100 confirms an intention to set a proposed alert 330 as an alert 111, pursuant to the query 455, the method 400 may proceed to a step 460 in which the alert 111 is set. The alert 111 may then be periodically compared with the operational data 112 in a manner similar to the comparison performed with the proposed alert 330 in the step 445.

The system 300 may, in a step 465, detect that the trigger condition of the alert 111 have been satisfied. In response, the method 400 may proceed to a step 465 in which notification of triggering of the alert 111 is transmitted to the user 100. As indicated previously, this may be done in a variety of ways, which may optionally be user-configurable. The method 400 may then end 490.

The method 400 of FIG. 4 is only one of many methods included within the scope of the present disclosure. Several examples will be presented in FIGS. 5-12, as follows. FIGS. 5-12 illustrate various user interfaces, methods, and alert structures, which are merely exemplary.

EXAMPLES

Referring to FIG. 5, a screenshot 500 illustrates entry of a proposed alert 330 via text entry, and provision of historical trigger data 370, according to one embodiment. The screenshot 500 illustrates software that may be used to facilitate multiple aspects of the management of an enterprise. As shown, the screenshot 500 may include an alert entry section 510, an activity indicator 520, an organizational alert listing 530, an organizational activity listing 540, and an individual alert summary 550.

The alert entry section 510 may be used by the user 100 to enter the proposed alert 330 via text entry. The alert entry section 510 may have a format similar to that of the alert 200 of FIG. 2A, the alert 230 of FIG. 2B, and the alert 260 of FIG. 2C. Thus, the alert entry section 510 may have a metric 560, an operator 562, and a threshold 564, which may be entered by the user through the use of dropdown menus and/or text entry, as appropriate. More specifically, arrows 566 adjacent to the metric 560 and the operator 562 may enable the metric 560 and the operator 562 to be selected from dropdown menus. The threshold 564 may be entered via text entry.

Optionally, the proposed alert 330 in FIG. 5 may also include a condition selection 568, which may be used to allow the user to select different options, such as transmission of a notification if the trigger condition is satisfied, and transmission of a notification if the trigger condition is not satisfied. In FIG. 5, the condition selection 568 is set to transmit notification if the trigger condition is satisfied.

In the example of FIG. 5, the metric 560 is "30-Day Average" (as applied to account balance), the operator 562 is "falls below," and the threshold 564 is "4,800,000." Thus, the proposed alert 330 entered in the alert entry section 510 will notify the user 100 if the 30-day average account balance of the enterprise's account falls below $4,800,000.

A follow alert button 570 may be displayed, and may be selected by the user 100, for example, by clicking or tapping, to apply the proposed alert 330 to the user 100 by causing the user 100 to "follow" an alert 111, already inexistence, that is identical to the proposed alert 330.

The activity indicator 520 may provide the historical trigger data 370 to the user 100 by indicating that the proposed alert 330 would have been triggered seven times within the last ninety days. This may help the user 100 to determine whether the proposed alert 330 is appropriately tuned. As shown, the activity indicator 520 may include a data visualization in the form of a trigger log 580, which graphically indicates when the proposed alert 330 would have been triggered within the past 90 days. Further, the activity indicator 520 may include text 522 that indicates the number of times the proposed alert 330 would have been triggered within the past 90 days. A historical value section 584 may provide additional helpful information regarding the historical values of the metric 560.

The organizational alert listing 530 may list alerts created and/or followed by others within the enterprise. The organizational alert listing 530 may have options for the user 100 to follow alerts 111 created and/or followed by other users so that the user 100 will also receive notification when those alerts 111 are triggered. Accordingly, the user 100 may easily set an alert 111 without entering a proposed alert 330 at all; the user 100 may simply browse the alerts 111 being followed by others in the enterprise and select to follow any that are satisfactory for his or her own informational needs.

The organizational activity listing 540 may list various activities within the enterprise. Some of these items may be KPI's (key performance indicators) being followed by the user, comments made by others at the enterprise, news pertinent to the enterprise, or the like.

The individual alert summary 550 may include a summary of alerts set by and/or followed by the user 100. As shown, the individual alert summary 550 may indicate how many alerts for the user 100 have been triggered recently, and how many alerts for the user 100 are close to triggering.

In some embodiments, the information in the activity indicator 520, the organizational alert listing 530, the organizational activity listing 540, and/or the individual alert summary 550 may include links so that the user 100 can select a pertinent piece of information to bring up additional information. For example, clicking on one of the alerts 111 shown in the organizational alert listing 530 may cause a more detailed description of the alert 111 to be displayed.

In at least one embodiment, the follow alert button 570 may only be active when the proposed alert 330 entered by the user 100 matches an alert 111 that has already been set. For example, the second alert 111 in the organizational alert listing 530 reads "Alert me if 30-day Average value of Cash balance falls below $4,800,000." This is identical to the proposed alert 330. Thus, the user 100 need not set a new alert. It may be advantageous for the user 100 to see other users that are also following the alert 111 in which he or he is interested. Further, preventing duplicative alerts 111 may help reduce the storage and/or processing loads on the system 300. Hence, the follow alert button 570 may replace a button that ordinarily permits the user 100 to set a new alert, but only when the proposed alert 330 is identical to one of the alert 111 that has already been set within the system 300.

Figure 6:
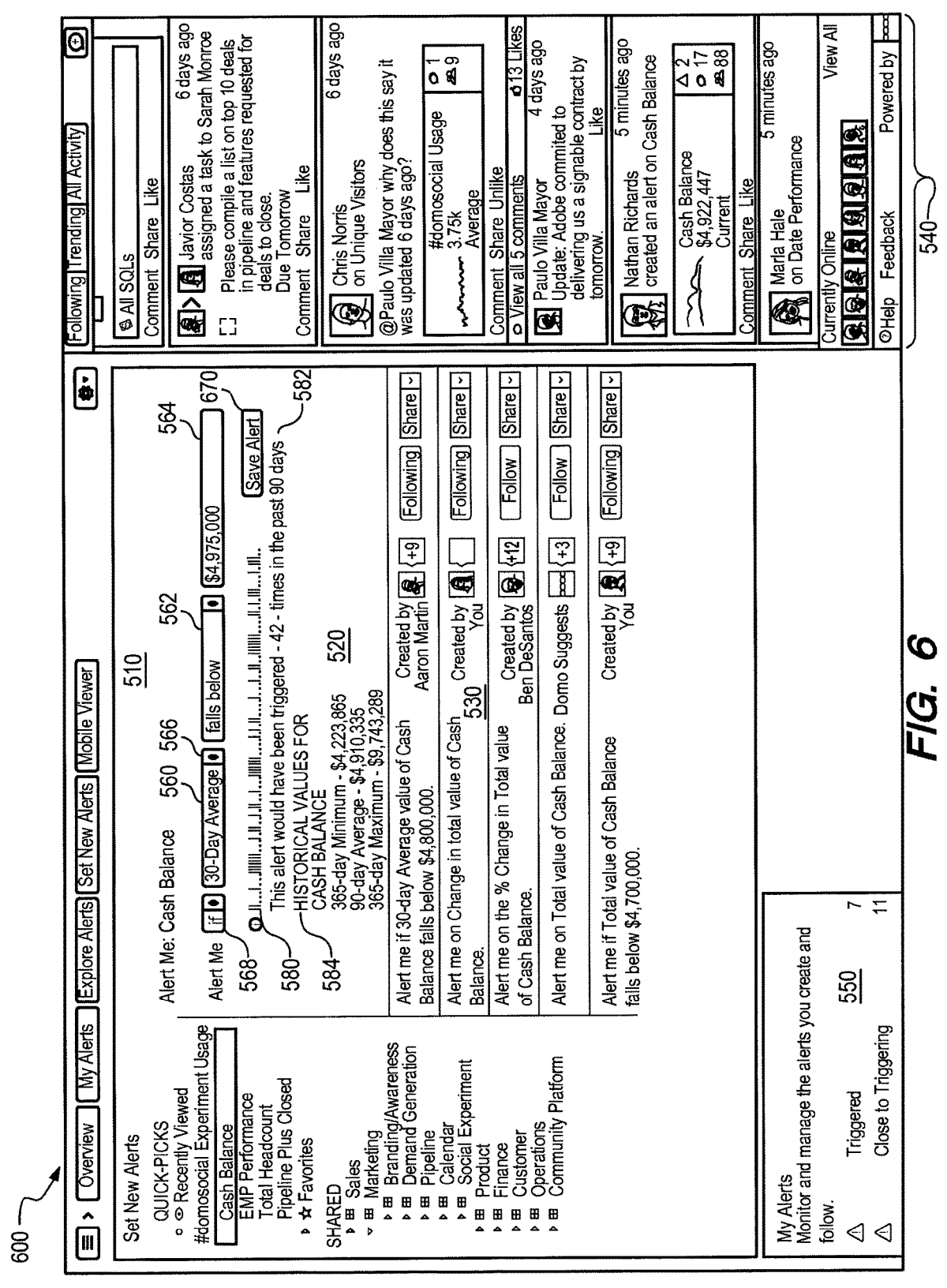

Referring to FIG. 6, a screenshot 600 depicts entry of a different proposed alert 330, and provision of historical trigger data 370, according to the embodiment of FIG. 5. In FIG. 6, the threshold 564 has been adjusted to $4,975,000. This proposed alert 330 is no longer identical to the alert 111 in the organizational alert listing 530 regarding cash balances; accordingly, the follow alert button 570 has been changed to a save alert button 670 that can be activated to save the proposed alert 330 as an alert 111 distinct from those in the organizational alert listing 530.

In some embodiments, the proposed alert 330 may not need to be identical to an alert 111 in order for the user 100 to be offered the option to follow the alert 111 rather than setting the proposed alert 330 as a new and separate alert 111. For example, various algorithms may be applied to the proposed alert 330 to determine whether it is close enough to an alert 111 to offer the user 100 the option to follow the existing alert 111. For example, if the metric 560 and the operator 562 of the proposed alert 330 are identical to those of an existing alert 111, the system 300 may determine whether the threshold 564 for the proposed alert 330 is within 5% (i.e., within the range of 5% under to 5% over) the threshold 564 of the existing alert 111. If the threshold 564 of the proposed alert 330 falls within this range, but is not identical to the threshold 564 of the existing alert, the user 100 may be offered both options, i.e., the option to follow the existing alert 111 and the option to set the proposed alert 330 as a new alert 111.

As also shown in FIG. 6, the activity indicator 520 now indicates that the proposed alert 330 would have been triggered forty-two times within the past ninety days. This is because the threshold 564 is more liberal than in the proposed alert 330 entered in FIG. 5.

Figure 7:
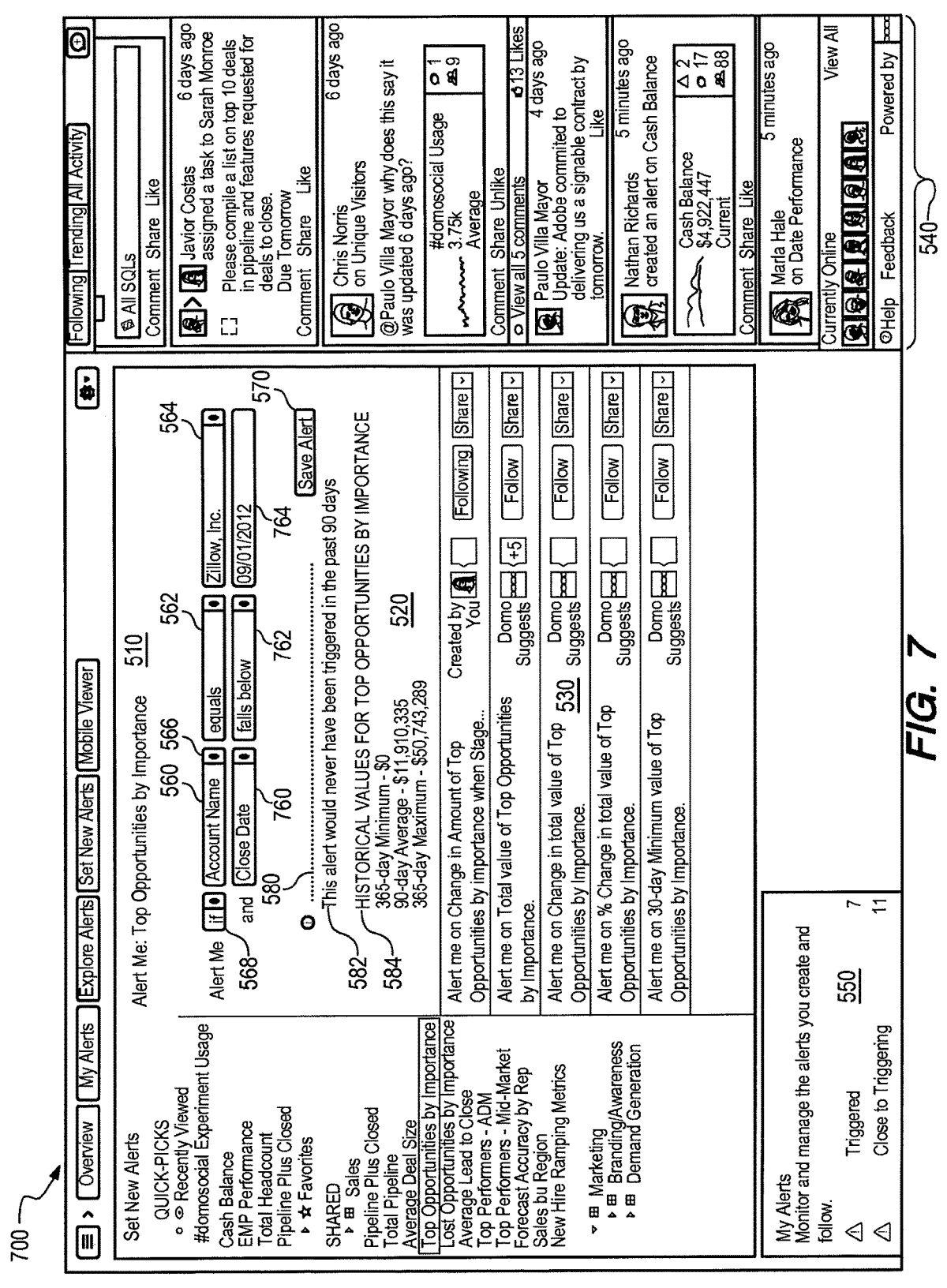

Referring to FIG. 7, a screenshot 700 depicts entry of a proposed alert 330 via text entry, and provision of historical trigger data 370, according to another embodiment. As shown, the alert entry section 510 of the screenshot 700 may have a proposed alert 330 with a different format than those of FIGS. 5 and 6.

More specifically, the proposed alert 330 of FIG. 7 may be a compound alert, with multiple trigger conditions that all have to be satisfied in order for the alert to be triggered. Thus, the proposed alert 330 of FIG. 7 may have a metric 560, an operator 562, and a threshold 564. These may be similar to previous embodiments, except that the threshold 564 may have an arrow 566 that permits it to be selected from a dropdown menu rather than via entry of text. The metric 560 may be "account name," the operator 562 may be "equals," and the threshold 564 may be "Zillow, Inc." Thus, this first portion of the proposed alert 330 may be satisfied if the account is for Zillow, Inc.

Further, the proposed alert 330 of FIG. 7 may have a second portion with a second metric 760, a second operator 762, and a second threshold 764. The second metric 760 may be "close date," the second operator 762 may be "falls below," and the second threshold 764 may be Sep. 1, 2012. Thus, this portion of the proposed alert 330 may be satisfied if the account was closed prior to Sep. 1, 2012. Inclusion of this second portion with the first portion may indicate that the account in question is the one specified in the first portion (i.e., Zillow, Inc.). Thus, the proposed alert 330 may be satisfied only if an account for Zillow, Inc. has been closed prior to Sep. 1, 2012.

The activity indicator 520 indicates that this alert has never been triggered within the past ninety days. Such compound alerts may be beneficial for setting alerts based on more specific sets of circumstances. In alternative embodiments, various operators may be applied between portions of an alert; for example, a proposed alert 330 may be satisfied if either a first portion or a second portion of the proposed alert 330 has been satisfied, rather than requiring satisfaction of both portions to trigger the proposed alert 330. Various buttons, widgets, and/or other user interface items may be used to facilitate the entry of compound alerts.

Figure 8:
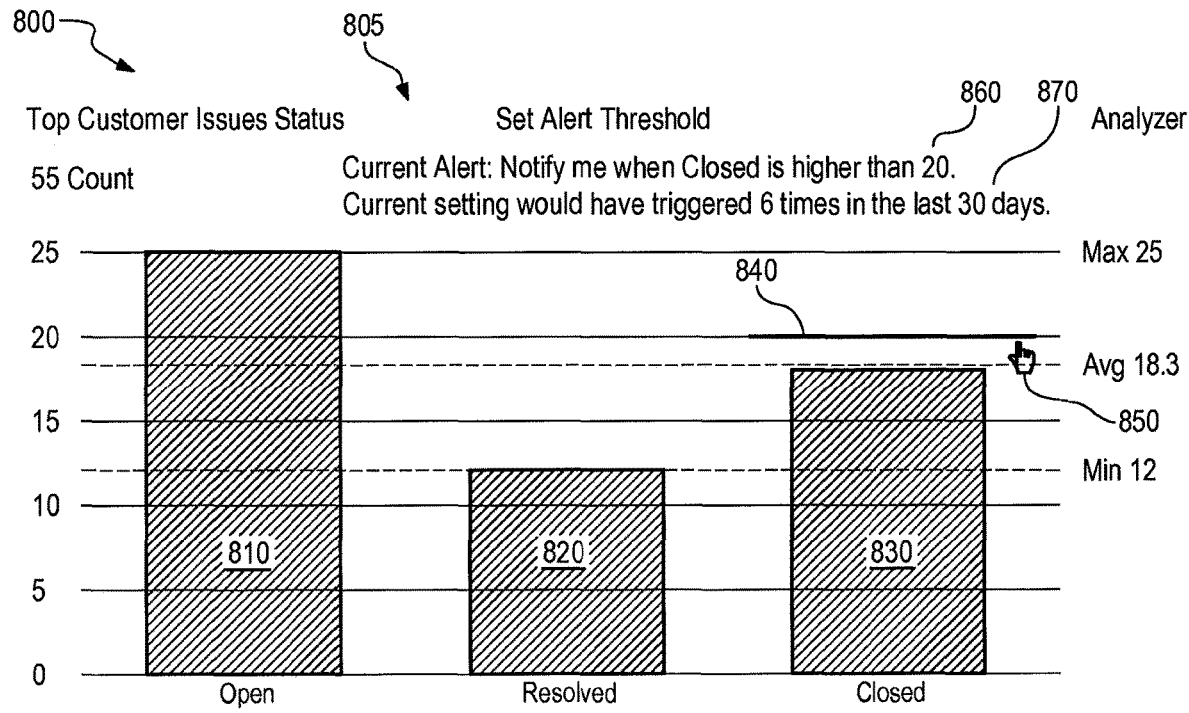
FIG. 8 is a screenshot depicting entry of a proposed alert via indication on a data visualization, and provision of historical trigger data, according to another embodiment.

Referring to FIG. 8, a screenshot 800 depicts entry of a proposed alert 330 via indication on a data visualization 805, and provision of historical trigger data 370, according to another embodiment. More specifically, the data visualization 805 may be a bar graph regarding customer issues, with a first bar 810 representing open issues, a second bar 820 representing resolved issues, and a third bar 830 representing closed issues. Rather than entering text and/or making a selection from a menu as in FIGS. 5, 6, and 7, FIG. 8 may allow the user 100 to enter a proposed alert 330 directly on the data visualization 805.

A threshold indicator 840 may be applied to the data visualization 805 in the form of a horizontal line. The threshold indicator 840 may be positioned with the aid of a pointer 850, which may be moved via motion of a mouse, finger, or other input device 102. The proposed alert 330 is shown in the form of a current alert section 860, which indicates that the proposed alert 330 will trigger notification of the user 100 when the number of closed customer issues represented by the third bar 830 exceeds 20 (the position at which the threshold indicator 840 currently resides). The threshold indicator 840 may be moved vertically to change the threshold of the proposed alert 330 to a number greater or less than 20. Additionally or alternatively, the threshold indicator 840 may be moved horizontally to change the metric of the proposed alert 330 to instead compare the threshold with a different quantity, such as the number of open customer issues represented by the first bar 810, or the number of resolved customer issues represented by the second bar 820.

If desired, the operator of the proposed alert 330 may be automatically set based on the context. For example, placing the threshold indicator 840 above the top of the third bar 830 may cause the proposed alert 330 to have a "higher than" operator. On the other hand, placing the threshold indicator 840 below the top of the third bar 830 may cause the proposed alert 330 to have a "lower than" operator. Placing the threshold indicator 840 at the top of the third bar 830 may cause the proposed alert 330 to have an "equals" operator. Alternatively, the operator of the proposed alert 330 may be user-selected, as shown in FIG. 9.

The historical trigger data 370 may be provided in the form of a trigger indicator 870, which indicates that the proposed alert 330 would have been triggered six times within the last thirty days. The trigger indicator 870 may update in real-time as the threshold indicator 840 is moved by the user. This may facilitate rapid selection of the appropriate threshold for the new alert 111 to be set by the user 100.

Figure 9:
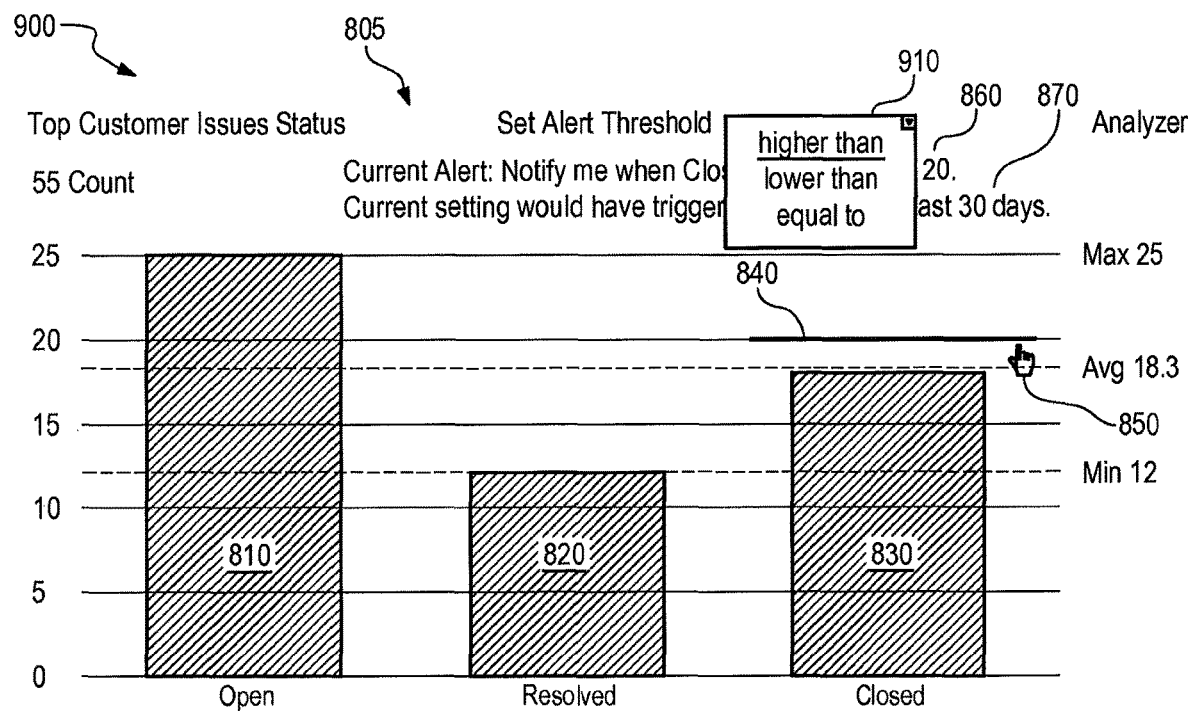
FIG. 9 is a screenshot depicting a further step in the entry of a proposed alert via indication on a data visualization, and provision of historical trigger data, according to the embodiment of FIG. 8.

Referring to FIG. 9, a screenshot 900 depicts a further step in the entry of a proposed alert 330 via indication on the data visualization 805, and provision of historical trigger data 370, according to the embodiment of FIG. 8. More specifically, in FIG. 9, an operator window 910 may be displayed, for example, in response to a change in the position of the threshold indicator 840.

The operator window 910 may display multiple operators that the user 100 can select from to formulate the different proposed alert 330. The options in the operator window 910 shown in FIG. 9 are "higher than," "lower than," and "equal to."

Figure 10:
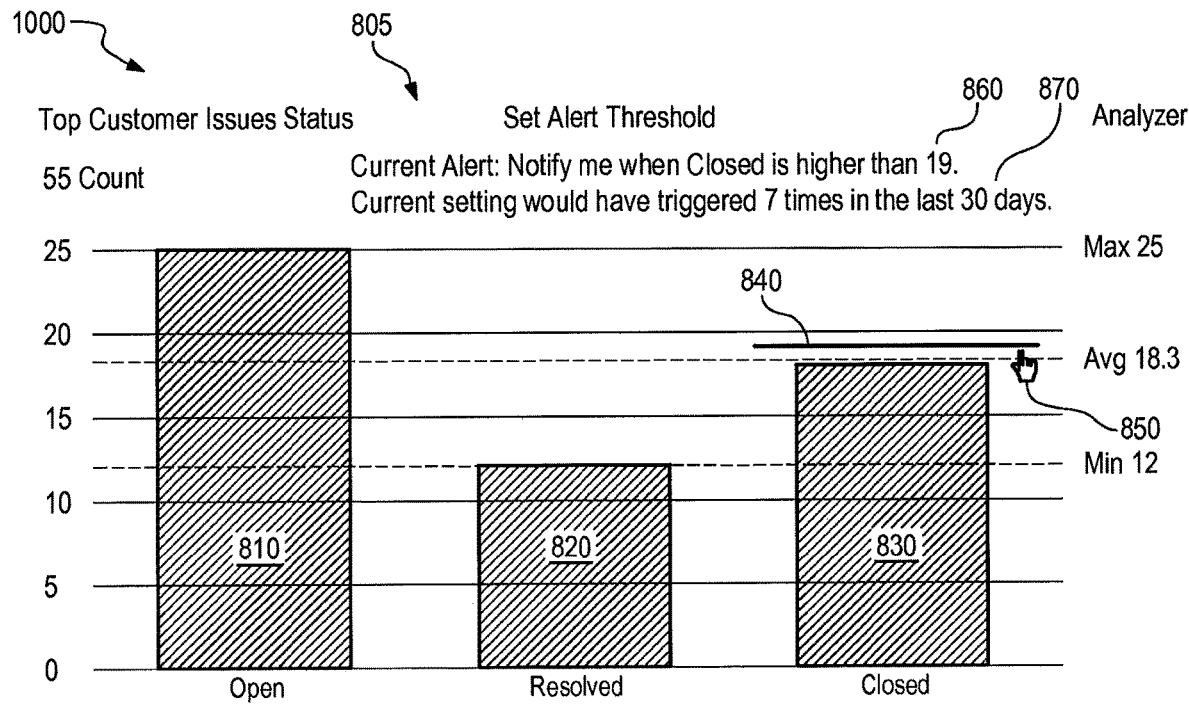
FIG. 10 is a screenshot depicting an additional step in the entry of a proposed alert via indication on a data visualization, and provision of historical trigger data, according to the embodiment of FIG. 8.

Referring to FIG. 10, a screenshot 1000 depicts an additional step in the entry of a proposed alert 330 via indication on the data visualization 805, and provision of historical trigger data 370, according to the embodiment of FIG. 8. As shown, the user 100 may click and drag the threshold indicator 840 with the pointer 850, and move the threshold indicator 840 vertically from 20 to 19.

This may cause the current alert section 860 to reflect that the different proposed alert 330 now has a threshold of 19. The trigger indicator 870 may also update to indicate that this new proposed alert 330 would have been triggered seven times within the past thirty days. Thus, the user 100 may easily tune the different proposed alert 330 to obtain the desired trigger frequency.

Figure 11:
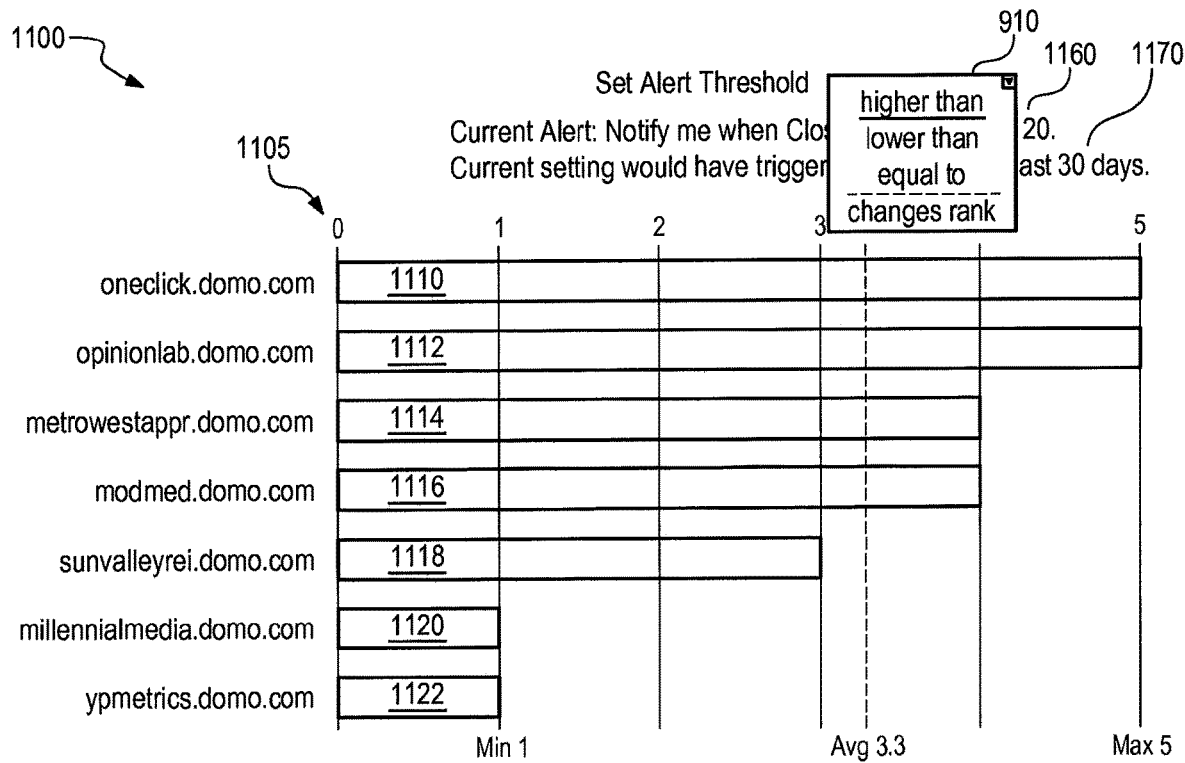
FIG. 11 is a screenshot depicting entry of a proposed alert via indication on a data visualization, and provision of historical trigger data, according to another embodiment.

Referring to FIG. 11, a screenshot 1100 depicts entry of a proposed alert 330 via indication on a data visualization 1105, and provision of historical trigger data 370, according to another embodiment. The data visualization 1105 may be a histogram indicating the number of visits to a related group of web sites. The data visualization 1105 may have a first bar 1110, a second bar 1112, a third bar 1114, a fourth bar 1116, a fifth bar 1118, a sixth bar 1120, and a seventh bar 1122.

As shown, the different proposed alert 330 may be set to trigger when any of the bars 1110, 1112, 1114, 1116, 1118, 1120, or 1122 has a value greater than seven. Any of a variety of menus, indicators, widgets, or other devices may be used to establish this proposed alert 330. In some examples, a threshold indicator (not shown) similar to the threshold indicator 840 may be used, but may take the form of a vertical, rather than horizontal, line. A wide variety of threshold indicators may be used to facilitate entry of a proposed alert 330 on a variety of data visualization types.

This may be shown in a current alert section 1160. A trigger indicator 1170 may display the historical trigger data 370 by showing that this proposed alert 330 would have been triggered six times within the past ninety days. As in previous embodiments, the trigger indicator 1170 may be updated in real-time as the proposed alert 330 is adjusted.

Figure 12:
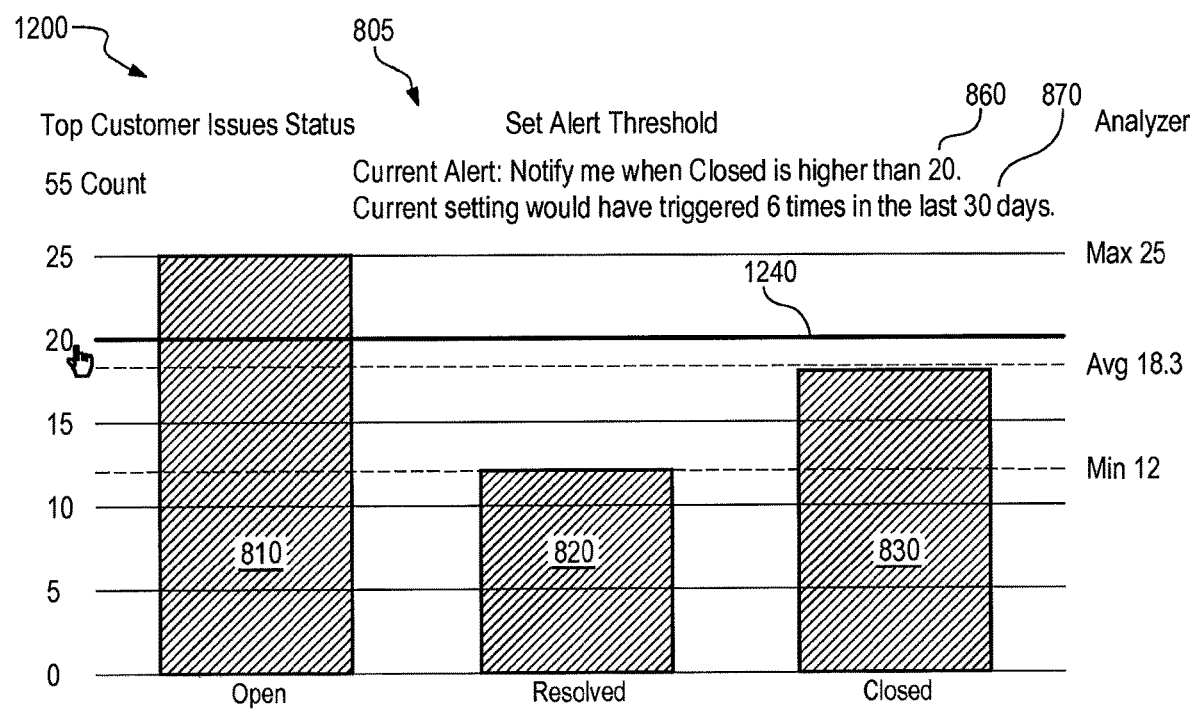
FIG. 12 is a screenshot depicting entry of a proposed alert via indication on a data visualization, and provision of historical trigger data, according to another embodiment.

Referring to FIG. 12, a screenshot 1200 depicts entry of a proposed alert 330 via indication on the data visualization 805, and provision of historical trigger data 370, according to the embodiment. The data visualization 805 may be the same as in FIG. 8. However, in the screenshot 1200, a threshold indicator 1240 may function in a manner similar to that of the threshold indicator 840 of FIG. 8, but may extend horizontally across the entire data visualization 805. This may facilitate entry of a proposed alert 330 that will be triggered in the event that any of the first bar 810, the second bar 820, and the third bar 830 exceeds the threshold value at which the threshold indicator 1240 is positioned (i.e., twenty).

Thus, the current alert section 860 may indicate that proposed alert 330 will provide notification when any series is higher than twenty. The trigger indicator 870 may indicate that this proposed alert 330 would have been triggered six times within the last thirty days. The threshold indicator 1240 may be moved horizontally to update the trigger indicator 870 in real-time, as in previous embodiments. However, in the embodiment of FIG. 12, the threshold indicator 1240 may not be moved horizontally. Various menus, widgets, or other tools may be used to select the type of threshold indicator to be used, facilitating the entry of different proposed alert types on any given data visualization.

As mentioned previously, the aggregated operational data sets 350 may help to expedite provision of the historical trigger data 370, thereby enabling the user 100 to see the effects of adjustment of a proposed alert 330, substantially in real-time. One exemplary aggregated operational data set 350 will be shown and described in connection with FIG. 13.

Figure 13:
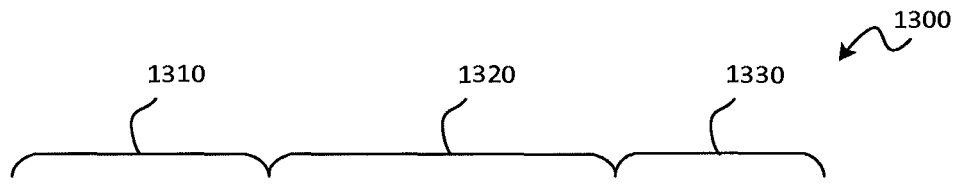
FIG. 13 is a table illustrating a portion of an aggregated operational data set, according to one embodiment.

Referring to FIG. 13, a table illustrates a portion 1300 of an aggregated operational data set, according to one embodiment. The portion 1300 of an aggregated operational data set 350 may have multiple columns, each of which contains a different data field. As shown, the portion 1300 may include order dates 1310, customer segments 1320, and sales 1330. The customer segment 1320 and the sales 1330 may be indexed according to the order date 1310. This may facilitate rapid lookup of date-based information in order to expedite provision of the historical trigger data 370, as described above.

As also described previously, multiple aggregated operational data sets 350 may optionally be used. Thus, for example, in addition to the aggregated operational data set 350 shown in FIG. 13, the operational data 112 may include other aggregated operational data sets 350, which may index other data (for example, salesperson, items purchased, payment terms, and the like). Such other data may advantageously also be indexed according to the order date 1310. However, this is only one exemplary aggregation scheme; according to alternative embodiments, other aggregation schema may be used.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be down-loaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMS), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

We claim:

1. A non-transitory computer-readable medium comprising instructions configured to cause a processor to perform operations for managing data alerts, the operations comprising:
    displaying first trigger metrics within a graphical user interface, the first trigger metrics pertaining to operation of first proposed trigger criteria on data corresponding to a particular time period;
    determining active trigger criteria in response to displaying the first trigger metrics; and
    setting an alert comprising the determined active trigger criteria, the alert configured to generate user notifications in response to data that satisfies the active trigger criteria.

2. The non-transitory computer-readable medium of claim 1, further comprising deriving the first proposed trigger criteria from active trigger criteria of an existing alert.

3. The non-transitory computer-readable medium of claim 2, further comprising selecting the existing alert from a plurality of existing alerts in response to one or more of:
    user interaction with the existing alert;
    user interaction with a graphical user interface configured to display one or more of the existing alerts; and
    matching user input to an element of the existing alert.

4. The non-transitory computer-readable medium of claim 1, wherein:
    displaying the first trigger metrics comprises displaying a data visualization of at least a portion of the data corresponding to the particular time period, and
    the operations further comprise defining a threshold for the active alert criteria from in response to display of the data visualization.

5. The non-transitory computer-readable medium of claim 1, wherein the first trigger metrics comprise one or more of: a number of times the first proposed trigger condition was satisfied during the particular time period and a frequency at which the first proposed trigger condition was satisfied during the particular time period.

6. The non-transitory computer-readable medium of claim 1, the operations further comprising:
    displaying second trigger metrics within the graphical user interface, the second trigger metrics pertaining to operation of second proposed trigger criteria on the data corresponding to the particular time period;
    wherein the active trigger criteria is determined in response to display of the second trigger metrics.

7. The non-transitory computer-readable medium of claim 6, wherein:
    displaying the first trigger metrics comprises applying the first proposed trigger criteria to the data corresponding to the particular time period; and
    displaying the second trigger metrics comprises:
        modifying one or more elements of the first proposed trigger criteria to produce the second proposed trigger criteria, and
        applying the second proposed trigger criteria to the data corresponding to the particular time period.

8. The non-transitory computer-readable medium of claim 1, the operations further comprising:
    identifying an existing alert that pertains to a specified element of the data; and
    deriving the first proposed trigger criteria from active trigger criteria of the existing alert.

9. The non-transitory computer-readable medium of claim 8, wherein setting the alert comprises configuring a user to follow the existing alert.

10. A system for managing alerts pertaining to a data set, the system comprising:
    a processor, configured to:
        cause a graphical user interface to display alert metrics corresponding to operation of a proposed alert condition on the data set over a specified time period;
        determine an active alert condition based on the proposed alert condition of the alert metrics displayed by the graphical user interface; and
        set an alert configured to generate user notifications in response to detecting data of the data set that satisfies the active alert condition.

11. The system of claim 10, wherein:
    the processor is further configured to cause the graphical user interface to display modified alert metrics, the modified alert metrics corresponding to operation of the proposed alert condition on the data set over a time period different from the specified time period, and
    the processor is configured to set the alert in response to display of the modified alert metrics.

12. The system of claim 10, wherein:
    the proposed alert condition defines a first threshold value for a measurement item derived from specified data elements of the data set; and
    to set the alert, the processor is further configured to:

a second threshold value for the measurement item in response to display of the alert metrics, and
include the second threshold value in the active alert condition of the alert.

13. The system of claim 12, wherein the proposed alert condition defines a first aggregation of specified elements of the data set, and wherein the processor is further configured to:
modify the proposed alert condition to define a second aggregation of the specified elements of the data set different from the first aggregation; and
cause the graphical user interface to display updated alert metrics, the updated alert metrics corresponding to operation of the modified proposed alert condition on the data set over the specified time period; and
determine the active alert condition for the alert in response to display of the updated alert metrics.

14. The system of claim 10, wherein:
the proposed alert condition defines a measurement to be derived from specified data of the data set, an operator, and a threshold pertaining to the measurement and the operator; and
the processor is further configured to:
revise the proposed alert condition in response to first user interaction with the graphical user interface, comprising the processor modifying one or more of the measurement, operator, and threshold in the revised proposed alert condition,
cause the graphical user interface to display revised alert metrics corresponding to operation of the revised proposed alert condition on the data set over the specified time period, and
determine the active alert condition in response to second user interaction with the graphical user interface, the active alert condition comprising one or more of the quantity, operator, and threshold defined by the revised proposed alert condition.

15. A method for managing alert notifications, comprising:
displaying first alert data pertaining to operation of a proposed alert on a data set over a designated time period within a graphical user interface of a computing device;
defining a trigger condition for an active alert in response to display of the first alert data; and
creating the active alert, the active alert configured to produce alert notifications in response to data of the data set that satisfies the trigger condition of the active alert.

16. The method of claim 15, further comprising:
modifying the proposed alert in response to user interaction with the graphical user interface, comprising modifying a first proposed trigger condition to produce a second proposed trigger condition for the modified proposed alert; and
displaying second alert data pertaining to operation of the modified proposed alert over the designated time period within the graphical user interface, wherein the active alert is created in response to display of the second alert data.

17. The method of claim 16, wherein the trigger condition of the active alert corresponds to one of the first trigger condition, the second trigger condition, and a third trigger condition different from the first trigger condition and the second trigger condition.

18. The method of claim 16, wherein:
the first proposed trigger condition defines a comparison between a quantity derived from specified elements of the data set and a first threshold, and wherein the second trigger condition defines a comparison between the quantity and a second threshold different from the first threshold, and
the trigger condition defined for the active alert comprises one of the first threshold and the second threshold.

19. The method of claim 15, wherein creating the active alert comprises:
associating the active alert with a user; and
monitoring the data set to detect data that satisfies the trigger condition of the active alert.

20. The method of claim 15, further comprising:
monitoring data maintained in a data set of a data management system; and
providing a notification corresponding to the active alert to one or more users in response to the monitoring detecting data that satisfies the trigger condition of the active alert.

* * * * *